United States Patent
An

(10) Patent No.: US 11,201,852 B2
(45) Date of Patent: Dec. 14, 2021

(54) NETWORK ADDRESS TRANSLATION

(71) Applicant: New H3C Technologies Co., Ltd., Zhejiang (CN)

(72) Inventor: Shaoliang An, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

(21) Appl. No.: 17/041,198

(22) PCT Filed: Mar. 22, 2019

(86) PCT No.: PCT/CN2019/079161
§ 371 (c)(1),
(2) Date: Sep. 24, 2020

(87) PCT Pub. No.: WO2019/184804
PCT Pub. Date: Oct. 3, 2019

(65) Prior Publication Data
US 2021/0036984 A1 Feb. 4, 2021

(30) Foreign Application Priority Data
Mar. 26, 2018 (CN) .......................... 201810252611.3

(51) Int. Cl.
*G06F 15/16* (2006.01)
*G06F 9/54* (2006.01)
(Continued)

(52) U.S. Cl.
CPC ........ *H04L 61/2503* (2013.01); *H04L 61/255* (2013.01); *H04L 61/2557* (2013.01)

(58) Field of Classification Search
CPC ................................................. H04L 61/2514
(Continued)

(56) References Cited

U.S. PATENT DOCUMENTS

2005/0114547 A1 5/2005 Wu
2007/0189486 A1 8/2007 Ise
(Continued)

FOREIGN PATENT DOCUMENTS

CN 101335770 A 12/2008
CN 101702657 A 5/2010
(Continued)

OTHER PUBLICATIONS

State Intellectual Property Office of the People's Republic of China, Office Action and Search Report Issued in Application No. 2018102526113, dated Jan. 6, 2020, 11 pages, (Submitted with Machine Translation).

(Continued)

*Primary Examiner* — Hamza N Algibhah
(74) *Attorney, Agent, or Firm* — Greenblum & Bernstein, P.L.C.

(57) ABSTRACT

A NAT method, apparatus and device are provided. According to the method, a target IP address and its reference port are obtained from a NAT resource pool, the reference port being a port in a corresponding consecutive port range. A first five-tuple is generated based on the target IP address, the reference port and an original five-tuple of the packet, and a second five-tuple is obtained by masking first-class bits of the reference port of the first five-tuple. Based on a hash result of the second five-tuple, a target bit indicating a non-conflicting state is determined from a pre-constructed bitmap. The state indicated by the target bit is set to be a conflicting state, and a target five-tuple is generated based on the target bit. The target five-tuple and the original five-tuple are recorded in a session table, and the packet is NAT-processed based on the target five-tuple.

10 Claims, 3 Drawing Sheets

(51) Int. Cl.
*H04L 29/06* (2006.01)
*H04L 29/12* (2006.01)

(58) Field of Classification Search
USPC .......................................................... 709/238
See application file for complete search history.

(56) References Cited

U.S. PATENT DOCUMENTS

| | | | |
|---|---|---|---|
| 2008/0285562 A1* | 11/2008 | Scott | H04L 45/745 |
| | | | 370/392 |
| 2009/0138960 A1* | 5/2009 | Felty | G06N 5/025 |
| | | | 726/14 |
| 2010/0303078 A1 | 12/2010 | Karir | |
| 2013/0301522 A1* | 11/2013 | Krishna | H04L 61/2517 |
| | | | 370/328 |
| 2013/0301650 A1* | 11/2013 | Zou | H04L 61/2557 |
| | | | 370/467 |
| 2015/0131666 A1* | 5/2015 | Kang | H04L 45/745 |
| | | | 370/392 |
| 2016/0234112 A1* | 8/2016 | Anand | H04L 45/64 |
| 2017/0078245 A1 | 3/2017 | Wan et al. | |
| 2017/0346707 A1* | 11/2017 | Menon | H04L 61/256 |
| 2018/0054385 A1* | 2/2018 | Dharmapurikar | H04L 49/3063 |
| 2018/0302410 A1* | 10/2018 | Venkataraman | H04L 63/0263 |
| 2019/0166099 A1* | 5/2019 | Hicks | H04L 63/164 |
| 2020/0252315 A1* | 8/2020 | Cociglio | H04L 43/024 |

FOREIGN PATENT DOCUMENTS

| | | |
|---|---|---|
| CN | 101800690 A | 8/2010 |
| CN | 102194002 A | 9/2011 |
| CN | 104243631 A | 12/2014 |
| CN | 107547690 A | 1/2018 |
| EP | 2804440 A1 | 11/2014 |
| GN | 1777194 A | 5/2006 |
| GN | 102111331 A | 6/2011 |
| GN | 106534394 A | 3/2017 |
| JP | 2010252103 A1 | 11/2010 |
| JP | 2013179421 A1 | 9/2013 |
| JP | 2013247389 A1 | 12/2013 |
| JP | 2016103697 A1 | 6/2016 |
| JP | 2021516923 A1 | 7/2021 |
| WO | 2010129682 A1 | 11/2010 |
| WO | 2017172183 A1 | 10/2017 |

OTHER PUBLICATIONS

ISA State Intellectual Property Office of the People's Republic of China, International Search Report Issued in Application No. PCT/CN2019/079161, dated Jun. 5, 2019, WIPO, 4 pages.
European Patent Office, Extended European Search Report Issued in Application No. 19777369.0, dated Feb. 4, 2021, Germany, 8 pages.
ISA State Intellectual Property Office of the People's Republic of China, Written Opinion of the International Searching Authority Issued in Application No. PCT/CN2019/079161, dated Jun. 5, 2019, WIPO, 8 pages.

* cited by examiner

NETWORK ADDRESS TRANSLATION

CROSS-REFERENCE TO RELATED APPLICATION

The present application is a U.S. National Phase of International Patent Application Serial No. PCT/CN2019/079161 entitled "NETWORK ADDRESS TRANSLATION" filed on Mar. 22, 2019. International Patent Application Serial No. PCT/CN2019/079161 claims priority to Chinese Patent Application No. 201810252611.3 entitled "A NAT TRANSLATION METHOD, APPARATUS AND NAT DEVICE" filed on Mar. 26, 2018. The entire contents of the above-referenced application are incorporated herein by reference for all purposes.

BACKGROUND

After a packet is received by a Network Address Translation (NAT) device, if the packet is to be NAT-processed and the packet satisfies a session information creation condition, the creation process is performed. The "session information" herein may include, for example, a five-tuple of a packet, that is, a source Internet Protocol (IP) address, a destination IP address, a source port, a destination port and a transport layer protocol.

NAT processing of a source IP address is taken as an example. An IP address and a port corresponding to the IP address are selected from a NAT resource pool, and a source IP address and a source port in an original five-tuple of the packet are replaced with the selected IP address and port to form a new five-tuple, and further, a hash table in a session table stored in a storage medium (such as a Double Data Rate (DDR) synchronous dynamic random access memory) is queried. When it is determined that the new five-tuple is a non-conflicting five-tuple, that is, a hash value calculated for the new five-tuple does not generate a hash conflict in the hash table, the new five-tuple and the original five-tuple are recorded in the hash table and a corresponding result table, and the NAT processing is performed for the packet based on the new five-tuple; otherwise, an IP address and a port corresponding to the IP address are re-selected from the NAT resource pool for analysis.

Although the NAT processing can be realized by the above creation process, the following problems still exist: only one new five-tuple can be detected in one conflict detection based on the existing manner of storing data of a hash table of a session table. When the new five-tuple generates a conflict, a plurality of detections is required. Since there is an interface delay every time the storage medium where the session table is located is read, the creation performance is undoubtedly terrible.

DETAILED DESCRIPTION OF THE EMBODIMENTS

Figure 1:
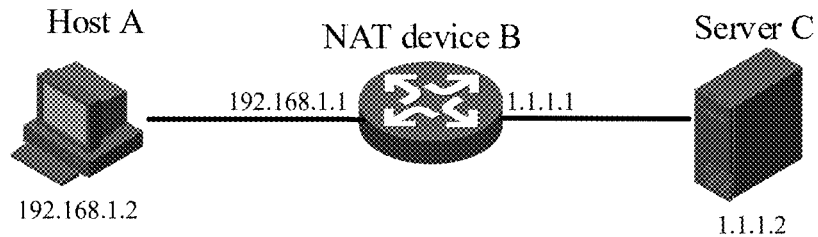
FIG. 1 is a schematic diagram illustrating a structure of a networking system according to an example of the present disclosure.

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

Relevant contents of Network Address Translation (NAT) will be described below to facilitate understanding the solutions of the present disclosure.

The NAT may be divided into Port Address Translation (PAT) and Not Port Address Translation (NO-PAT) based on a translation mode. In the NO-PAT mode, one extranet IP address (i.e., public network IP address) can be only assigned to one intranet IP address for NAT processing; in the PAT mode, one extranet IP address may be simultaneously assigned to a plurality of intranet IP addresses for sharing. The NAT mentioned in the present disclosure refers to the PAT mode.

In addition, the NAT may include an ingress interface translating a source IP address, an ingress interface translating a destination IP address, an egress interface translating a source IP address, and an egress interface translating a destination IP address according to different networking applications, and different address translation processes are similar.

The present disclosure provides a NAT method, a NAT apparatus and a NAT device to improve creation performance of a NAT process.

Firstly, the NAT method provided by the present disclosure will be described below.

The NAT method provided by the present disclosure is applied to a NAT device. Specifically, the NAT method may be executed by a CPU in the NAT device. Certainly, the NAT method may also be executed jointly by the CPU and some hardware, where the some hardware may be an Application Specific Integrated Circuit (ASIC) or a Field-Programmable Gate Array (FPGA). The NAT device is an edge device of a network, and is configured to achieve purposes of allowing an internal network user to access an external public network and an external public network to access a part of internal resources (e.g., an internal server). For example, the NAT device may be a router, which is not limited herein.

In addition, in the present disclosure, a bitmap is pre-constructed, each bit in the bitmap is used to indicate a state of a five-tuple, i.e., a conflicting state or a non-conflicting state, where the bitmap is stored in a storage medium of the NAT device. Specifically, the bitmap includes a plurality of entries, each entry includes a plurality of bits, and each bit corresponds to a binary character string with a same number of bits as first-class bits. The first-class bits are first-class bits of two classes of ports (i.e., a port subjected to NAT processing and a port not subjected to NAT processing) of the five-tuple, and a number and a location of the first-class bits may be set according to an actual situation. For example, the first-class bits may be the 0-th bit of the port, or the 0th bit and the 1st bit of the port, or the 0th bit, the 1st bit and the 2nd bit of the port, or the 14th bit and the 15th bit of the port, or the like. Based on the bitmap, a plurality of five-tuples which differ from each other only in the first-class bits of a particular port may uniquely correspond to one bit in a same entry respectively. That is, any entry may correspond to a plurality of five-tuples which differ from each other only in the first-class bits of a particular port.

Each entry in the bitmap includes a row of bits. When the bitmap is initialized, a hash value with a fixed number of bits may be taken as an index for each entry, and the states indicated by a plurality of bits in each entry may all be initialized to a non-conflicting state. In this way, after a non-conflicting target five-tuple is determined in each creation process, the state indicated by a bit corresponding to the target five-tuple in the bitmap may be set to a conflicting state. Further, in a specific application, for each bit, 0 indicates a non-conflicting state and 1 indicates a conflicting state. Then, the bits in the bitmap are all 0 due to initialization.

To facilitate understanding the solutions, in an example of the present disclosure, a networking system applicable to a method provided by the present disclosure is provided, the structure of which is schematically illustrated in FIG. 1. As shown in FIG. 1, the networking system includes a host A, a NAT device B and a server C. The host A and the server C belong to different networks, that is, the host A belongs to an intranet and the server C belongs to an extranet. Therefore, when the host A sends a packet to the server C, the NAT device is required to perform NAT processing for the packet from the host A, and then sends the NAT-processed packet to the server C. Similarly, when the server C sends a packet to the host A, the NAT device is required to perform NAT processing for the packet from the server C, and then sends the NAT-processed packet to the host A. To improve creation performance, the NAT device B in FIG. 1 may perform NAT processing for the packet sent from the host A to the server C and the packet sent from the server C to the host A by using a NAT method provided by the present disclosure.

Figure 2:
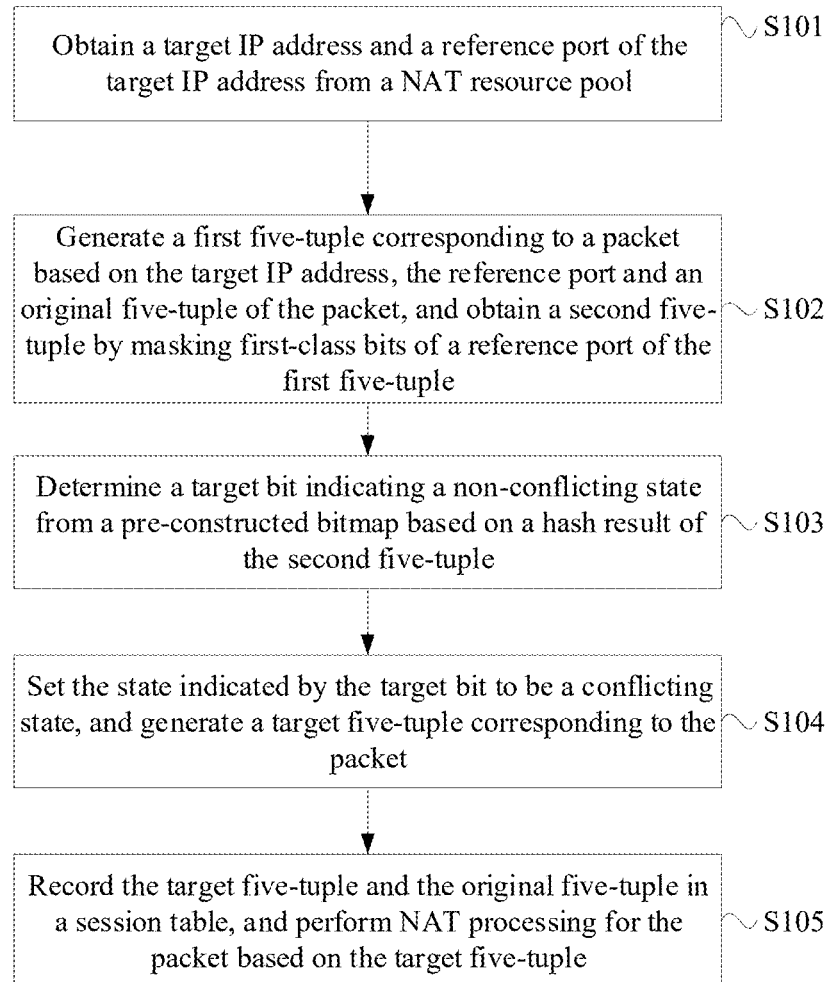
FIG. 2 is a flowchart illustrating a NAT method according to an example of the present disclosure.

As shown in FIG. 2, a NAT method provided by the present disclosure may include the following blocks.

At block S101, a target IP address and a reference port of the target IP address are obtained from a NAT resource pool, where the reference port is a port in a consecutive port range of the target IP address.

When a NAT device receives a packet from another device in the networking system, if the packet requires NAT processing and satisfies a session information creation condition, the NAT device performs a creation process. In the solution provided by the present disclosure, when performing the creation process, the NAT device may obtain a target IP address and a reference port of the target IP address from a NAT resource pool, where the reference port is a port in a consecutive port range of the target IP address. Further, when selecting the port, the NAT device may perform, for example, a random selection or a sequential selection with a value obtained by hash calculation for the original five-tuple of the packet.

For a packet, an original five-tuple of the packet may include a source IP address, a destination IP address, a source port, a destination port and a transport protocol. The translation requirement for NAT processing may include only translation for the source IP address or the destination IP address, and may also include translation for both the source IP address and the destination IP address. Therefore, after the target IP address and the reference port are obtained, if it is desired to translate the source IP address, the source IP address in the original five-tuple is replaced with the target IP address and the source port is replaced with the reference port; if it is desired to translate the destination IP address, the destination IP address in the original five-tuple is replaced with the target IP address and the destination port is replaced with the reference port. In addition, in the disclosure, the target IP address mentioned is an IP address taken from the NAT recourse pool as a source IP address or a destination IP address; the reference port is a port taken from a consecutive port range of the target IP address as a source port or a destination port.

Further, it may be determined based on an Access Control List (ACL) whether a packet requires NAT processing, a translation requirement for the NAT processing, a NAT resource pool for the NAT processing, and the like. There is a plurality of NAT resource pools stored in a NAT device, for handling different types of IP addresses, and each NAT recourse pool including IP addresses and port ranges corresponding to the IP addresses.

For example, for a packet in a data flow under a Transmission Control Protocol (TCP), whether the packet satisfies a session information creation condition may be specifically determined as follows:

it is determined whether the packet is a first packet; and if yes, it is determined that the packet satisfies the session information creation condition.

For a packet in a data flow under a User Datagram Protocol (UDP), whether the packet satisfies a session information creation condition may be specifically determined as follows:

it is determined whether the packet can be directly NAT-processed based on a session table; and if not, it is determined that the packet satisfies the session information creation condition.

Descriptions are made herein only with the TCP and the UDP as examples, which is not limited. In a specific application, similar processing may be performed for a packet in a data flow under any other protocol. For example, if the packet cannot be directly NAT-processed based on the session table, it is determined that the packet satisfies the session information creation condition.

At block S102, a first five-tuple corresponding to the packet is generated based on the target IP address, the reference port and an original five-tuple of the packet, and a second five-tuple is obtained by masking first-class bits of the reference port of the first five-tuple.

At block S103, a target bit indicating a non-conflicting state is determined from a pre-constructed bitmap based on a hash calculation result of the second five-tuple;

each bit in the bitmap is used to indicate whether the state of the five-tuple is a conflicting state or a non-conflicting state.

At block S104, the state indicated by the target bit is set to a conflicting state, and a target five-tuple corresponding to the packet is generated based on the target bit.

After the target IP address and the reference port are obtained, the NAT device may generate the first five-tuple corresponding to the packet by replacing the source IP address or the destination IP address in the original five-tuple of the packet with the target IP address and replacing the source port or the destination port in the original five-tuple with the reference port based on the translation requirement corresponding to the packet. After obtaining the first five-tuple, the NAT device may obtain the second five-tuple by masking the first-class bits of the reference port in the first five-tuple, that is, setting the first-class bits to 0. Specifically, when the source IP address is translated, the first-class bits of the source port in the first five-tuple are masked; when the destination IP address is translated, the first-class bits of the destination port in the first five-tuple are masked.

Therefore, the NAT device may determine the target bit indicating a non-conflicting state from the pre-constructed bitmap based on the hash calculation result of the second five-tuple. Further, after obtaining the target bit, the NAT device may set the state indicated by the target bit to a conflicting state, and generate the target five-tuple corresponding to the packet based on the target bit. Specifically, the target five-tuple corresponding to the packet may be generated based on the target bit by: recovering the masked first-class bits in the second five-tuple with a binary character string corresponding to the target bit so as to obtain the target five-tuple corresponding to the packet.

It may be understood that a port is indicated by 16 bits, that is, both the source port and the destination port are indicated by 16 bits. For the first-class bits, a number and a location of the bits may be set according to an actual situation. For example, the first-class bits may be the 0th bit of the port, or the 0th bit and the 1st bit of the port, or the 0th bit, the 1st bit and the 2nd bit of the port, or the 14th bit and the 15th bit of the port, or the like. For convenience of calculation, in a specific application, the first-class bits are at least one consecutive bit at the end of the port, and the specific number of bits may be set according to a specific application environment. For example, the first-class bits may be two consecutive bits at the end of the port, that is, the 0th bit and the 1st bit, or the first-class bits may be three consecutive bits at the end of the port, that is, the 0th bit, the 1st bit and the 2nd bit, or the first-class bits may be four consecutive bits at the end of the port, that is, the 0th bit, the 1st bit, the 2nd bit and the 3rd bit, or the like.

In addition, the bitmap includes a plurality of entries, each entry including a plurality of bits, and each bit corresponding to a binary character string with a same bit number as the first-class bits. Therefore, the number of bits included in each entry is related to the bit number of the first-class bits, and is $2^N$, where N is the bit number of the first-class bits. Each bit corresponds to a binary character string with a same bit number as the first-class bits, and the correspondence may be sorted in the size of the binary character string. For example, if N is 7, the bits in one entry sequentially correspond to 0000000, 0000001, 0000010, . . . , 1111111 respectively, or correspond to 1111111, 1111110, 1111101, 1111100, . . . , 0000001, 0000000 respectively.

Specifically, in an implementation, the block of determining the target bit indicating the non-conflicting state from the pre-constructed bitmap based on the hash result of the second five-tuple may include:

calculating a first index value corresponding to the second five-tuple based on a first hash algorithm, and determining a first entry from the pre-constructed bitmap based on the first index value; and determining a target bit from the first entry, where the state corresponding to the target bit is a non-conflicting state, and a port formed by the binary character string corresponding to the target bit and an unmasked part of the reference port is located within the consecutive port range.

It may be known from the contents stored in the bitmap that the first entry may include entries corresponding to the second five-tuple and a plurality of five-tuples which differ from the second five-tuple only in the first-class bits. Further, the first hash algorithm may include, but not limited to: a Message Digest Algorithm (MD) or a Secure Hash Algorithm (SHA).

Some ports belong to invalid ports in a NAT resource pool, and the port formed by the binary character string corresponding to the bit in the first entry and the unmasked part of the reference port may belong to an invalid port in the NAT resource pool. Therefore, to prevent the port in the target five-tuple generated based on the target bit from belonging to the invalid port, the determined target bit satisfies the following conditions: the state corresponding to the target bit is a non-conflicting state, and the port formed by the binary character string corresponding to the target bit and the unmasked part of the reference port is located within the consecutive port range.

The process of determining the target bit from the first entry may include: determining at least one bit indicating a non-conflicting state from the first entry, and then, determining a target bit from the at least one bit, where a port formed by a binary character string corresponding to the target bit and the unmasked part of the reference port is located within the consecutive port range. Optionally, the process of determining the target bit from the first entry may include: determining at least one bit in which a port formed by a binary character string corresponding to the bit and the unmasked part of the reference port is located within the consecutive port range from the first entry, and then determining the target bit indicating the non-conflicting state from the determined at least one bit.

In addition, in a specific application, it may be required to perform NAT processing for one packet several times. Therefore, there may be a plurality of target five-tuples. Based on such processing idea, a target number of target bits may be determined from the bitmap based on the hash result of the second five-tuple. Also, the target number may be recorded in the ACL, and the target number may be obtained by querying the ACL.

At block S105, the target five-tuple and the original five-tuple are recorded in a session table, and NAT processing is performed for the packet based on the target five-tuple.

The session table is divided into two levels of tables, i.e., a hash table and a result table. The hash table is the first-level table of session table used for storing signature information of a five-tuple obtained by hash calculation and a pointer pointing to the result table; the result table is the second-level table of the session table used for storing a five-tuple and other forwarding-related information.

Therefore, after determining the target five-tuple, the NAT device may record the target five-tuple and the original five-tuple in the hash table and the result table. Further, after determining the target five-tuple, the NAT device may perform NAT processing for the packet, specifically including: replacing the original five-tuple in the packet with the target five-tuple.

Further, when it is detected that content recorded in the session table corresponding to the target five-tuple is deleted, the target five-tuple is recovered to be in an available state. To ensure the validity of the bitmap, the state indicated by a bit corresponding to the target five-tuple in the bitmap may be recovered. Therefore, the NAT method provided by the present disclosure may also include the following blocks.

Correspondingly, determining the address translation type corresponding to the target five-tuple may specifically include:

determining the address translation type corresponding to the target five-tuple from the session table.

In a specific application, the address translation type may be translating a source IP address and a destination IP address, translating a source IP address and then a destination IP address, or translating a destination IP address and then a source IP address. The value of the address translation type may be represented in many manners. Optionally, in a specific implementation, the value of the address translation type may be formed by three bits, where the highest bit refers to whether to translate, and the lower two bits refer to a translation manner. Specifically, when the address translation type is represented by three bits, a corresponding relationship of the address translation type and its value is described in the following Table 1.

TABLE 1

| Value of type | 0xx | 110 | 101 | 111 | 100 |
|---|---|---|---|---|---|
| Address translation type | No address translation | Translating source IP address | Translating destination IP address | Translating source IP address and then destination IP address | Translating destination IP address and then source IP address |

At block a1, an address translation type corresponding to the target five-tuple is determined when it is detected that content recorded in the session table corresponding to the target five-tuple is deleted.

At block a2, a port matched with the address translation type in the target five-tuple is determined, and a third five-tuple is obtained by masking first-class bits of the determined port.

When the determined address translation type is translating a source IP address, the port matched with the address translation type in the target five-tuple is: a source port; when the determined address translation type is translating a destination IP address, the port matched with the address translation type in the target five-tuple is: a destination port.

At block a3, a second index value corresponding to the third five-tuple is calculated based on the first hash algorithm, and a second entry is determined from the bitmap based on the second index value.

At block a4, a bit corresponding to a target binary character string is determined from the second entry, and the state indicated by the determined bit is set to a non-conflicting state, where the target binary character string is the first-class bits of the port matched with the address translation type in the target five-tuple.

Optionally, in a specific implementation, the NAT device corresponds to one address translation type. Then, the address translation type corresponding to the target five-tuple may be specifically determined as follows: the address translation type corresponding to the NAT device is taken as the address translation type corresponding to the target five-tuple.

Optionally, in another specific implementation, the NAT device corresponds to at least two address translation types. Then, the block of recording the target five-tuple and the original five-tuple in the session table may include:

recording the target five-tuple, the original five-tuple and the address translation type of the NAT in the session table.

If the original five-tuple recorded in the session table is (src_ip1, dst_ip1, src_port1, dst_port1, prot), when relevant information of the target five-tuple recorded in the session table is deleted, a process of recovering a corresponding bit in the bitmap may be as follows:

if the highest bit of the value of type is 0, no address translation is required and the process is ended;

if the value of type is 110 (translating the source IP address) and the target five-tuple is [src_ip2, dst_ip1, src_port2, dst_port1, prot], when the bit is recovered, with [src_ip2, dst_ip1, src_port2, dst_port1, prot] being the five-tuple to be used (i.e., the target five-tuple at blocks a1-a4), the above bit recovering process, i.e., blocks a1-a4, is performed;

if the type value is 101 (translating the destination IP address) and the target five-tuple is [src_ip1, dst_ip2, src_port1, dst_port2, prot], when the bit is recovered, with [src_ip1, dst_ip2, src_port1, dst_port2, prot] being the five-tuple to be used (i.e., the target five-tuple at blocks a1-a4), the above bit recovering process, i.e., blocks a1-a4, is performed;

if the type value is 111 (translating the source IP address and then the destination IP address) and the target five-tuple is [src_ip2, dst_ip2, src_port2, dst_port2, prot], when the bit is recovered, with [src_ip2, dst_ip1, src_port2, dst_port1, prot] being the five-tuple to be used (i.e., the target five-tuple at blocks a1-a4), the above bit recovering process is performed, and then, with [src_ip2, dst_ip2, src_port2, dst_port2, prot] being the five-tuple to be used (i.e., the target five-tuple at blocks a1-a4), the above bit recovering process, i.e., blocks a1-a4, is performed; and if the type value is 100 (translating the destination IP address and then the source IP address) and the target five-tuple is [src_ip2, dst_ip2, src_port2, dst_port2, prot], when the bit is recovered, with [src_ip1, dst_ip2, src_port1, dst_port2, prot] being the five-tuple to be used (i.e., the target five-tuple at blocks a1-a4), the above bit recovering process is performed, and then, with [src_ip2, dst_ip2, src_port2, dst_port2, prot] being the five-tuple to be used (i.e., the target five-tuple at blocks a1-a4), the above bit recovering process, i.e., blocks a1-a4, is performed.

The above value of the address translation type is used only as an example, and should not constitute limitations to the present disclosure.

In the solution provided by the present disclosure, the bitmap is pre-constructed, and each bit in the bitmap is used to indicate a state of the five-tuple; and then, a non-conflicting five-tuple is determined by querying the bitmap in a creation process. In the solution of the present disclosure, the target bit indicating the non-conflicting state is directly determined from the bitmap, and the non-conflicting five-tuple is further determined based on the target bit, so that the number of times of reading the storage medium is reduced, thereby solving a problem of poor creation performance through the solution of the present disclosure.

A NAT method provided by the present disclosure will be described below in combination with an application example.

In the application example, as shown in FIG. 1, the networking system specifically includes: a host A, a NAT device B and a server C, where an IP address of the host A is 192.168.1.2, an intranet IP address of the NAT device B is 192.168.1.1, an extranet IP address of the NAT device B is 1.1.1.1, and an IP address of the server C is 1.1.1.2.

In a DDR of the NAT device, a bitmap is pre-constructed, each entry in the bitmap includes 128 bits, and each bit corresponds to a 7-bit binary character string. The bit value being 1 indicates a conflicting state, and the bit value being 0 indicates a non-conflicting state. Also, the bits in the initialized bitmap are all 0.

Figure 3:
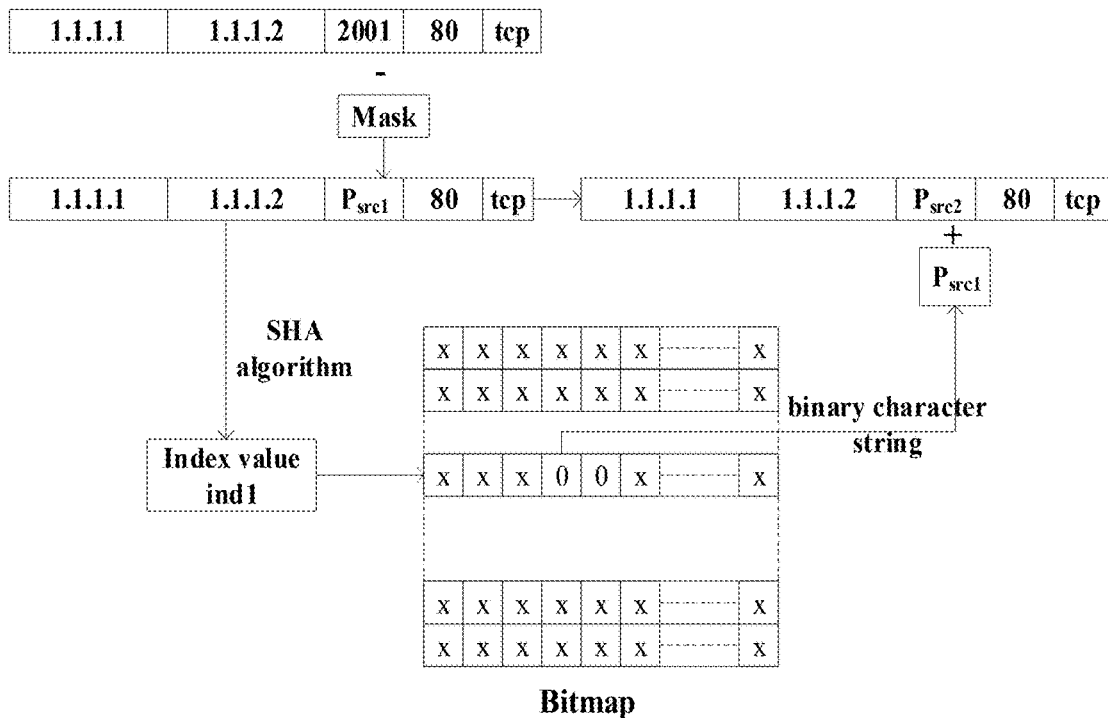
FIG. 3 is a schematic diagram illustrating a graph of determining a target five-tuple corresponding to a packet based on a bitmap during source IP address translation according to an example of the present disclosure.
Figure 4:
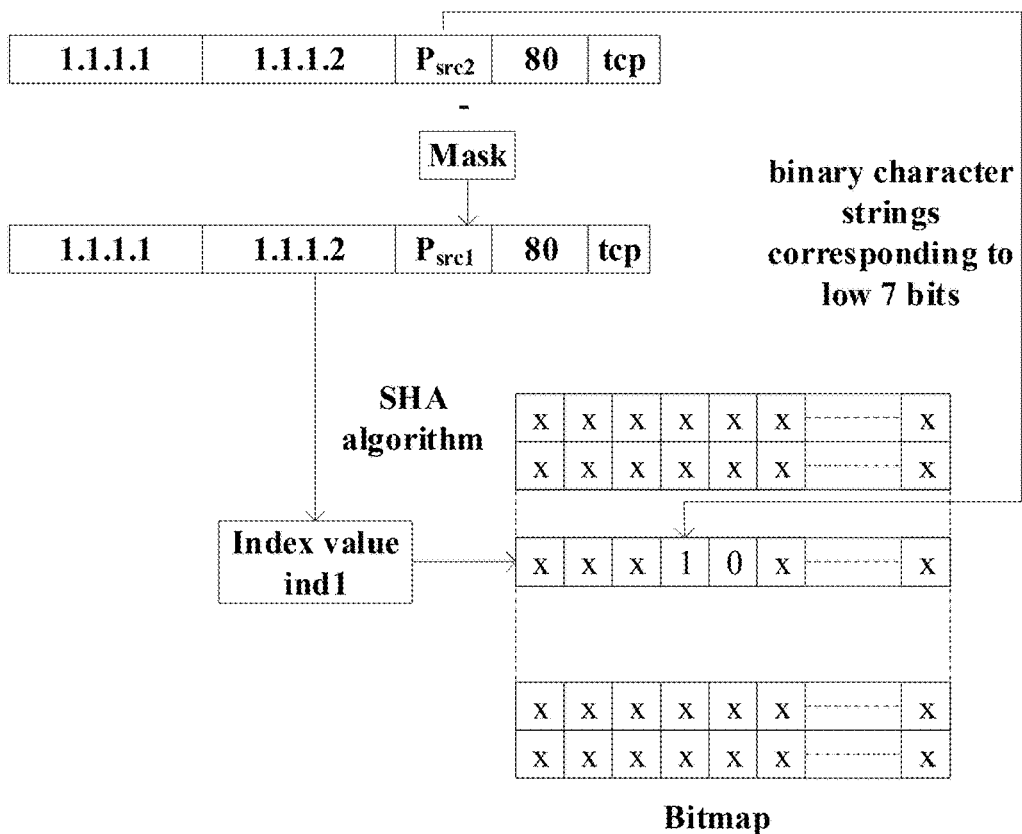
FIG. 4 is a schematic diagram illustrating a graph of recovering a bit in a bitmap during source IP address translation according to an example of the present disclosure.

As shown in FIG. 3 and FIG. 4, the NAT method provided by the present disclosure may include the following blocks.

At block b1, after receiving a packet sent from the host A to the server C, the NAT device B determines that the packet requires NAT processing and satisfies a session information creation condition, and continues to perform block b2.

An original five-tuple of the packet is [192.168.1.2, 1.1.1.2, 2222, 80, tcp]. In the original five-tuple, a source IP address is 192.168.1.2, a destination IP address is 1.1.1.2, a source port is 2222, a destination port is 80, and a transport protocol is tcp.

At block b2, a target IP address and a reference port of the target IP address are obtained from a NAT resource pool, where the reference port is a port in a consecutive port range of the target IP address.

The NAT resource pool is a resource pool, based on which the source IP address translation is performed.

It is assumed that the target IP address is 1.1.1.1, and the reference port is 2001.

At block b3, a five-tuple G1 corresponding to the packet is generated by replacing the source IP address in the original five-tuple of the packet with the target IP address and replacing the source port in the original five-tuple with the reference port, and a five-tuple G2 is obtained by masking low 7 bits of the source port of the first five-tuple, that is, filling the low 7 bits with 0.

The five-tuple G1 is [1.1.1.1, 1.1.1.2, 2001, 80, tcp]; correspondingly, the five-tuple G2 is [1.1.1.1, 1.1.1.2, $P_{src1}$, 80, tcp].

At block b4, an index value ind1 corresponding to the five-tuple G2 is calculated based on a SHA algorithm, and an entry M is determined from the bitmap based on the index value ind1.

At block b5, a target bit is determined from the entry M, where a state corresponding to the target bit is a non-conflicting state, and a port formed by a binary character string corresponding to the target bit and an unmasked part of the source port is located within a consecutive port range.

At block b6, the state indicated by the target bit is set to a conflicting state, and a target five-tuple corresponding to the packet is generated based on the target bit.

The target five-tuple is [1.1.1.1, 1.1.1.2, $P_{src2}$, 80, tcp], where $P_{src2}$ is a value obtained by recovering the low 7 bits in $P_{src1}$ with the binary character string corresponding to the target bit.

At block b7, the target five-tuple and the original five-tuple are recorded in a session table, and NAT processing is performed for the packet based on the target five-tuple.

At block b8, when it is detected that content recorded in the session table corresponding to the target five-tuple is deleted, it is determined that an address translation type corresponding to the target five-tuple is translating source IP address.

At block b9, a port matched with the address translation type in the target five-tuple is determined as the source port, and a five-tuple G3 is obtained by masking the low 7 bits of the source port.

The five-tuple G3 is [1.1.1.1, 1.1.1.2, $P_{src1}$, 80, tcp].

At block b10, the index value ind1 corresponding to the five-tuple G3 is calculated based on the SHA algorithm, and the entry M is determined from the bitmap based on the index value ind1.

At block b11, a bit corresponding to a target binary character string is determined from the entry M, and the state indicated by the determined bit is set to a non-conflicting state, where the target binary character string is low 7 bits of the source port in the target five-tuple.

When the address translation type corresponding to the original five-tuple is translating the destination IP address, NAT processing is similar to the above blocks b1-b12 except that the processing of the destination port and the source port are swapped.

In addition, in the bitmaps shown in FIG. 3 and FIG. 4, a current value of each bit is indicated by X, and may be 1 or 0.

In the solution of the present disclosure, the target bit indicating the non-conflicting state is directly determined from the bitmap, and the non-conflicting five-tuple is further determined based on the target bit, so that the number of times of reading the storage medium is reduced, thereby solving the problem of poor creation performance through the solution of the present disclosure.

Figure 5:
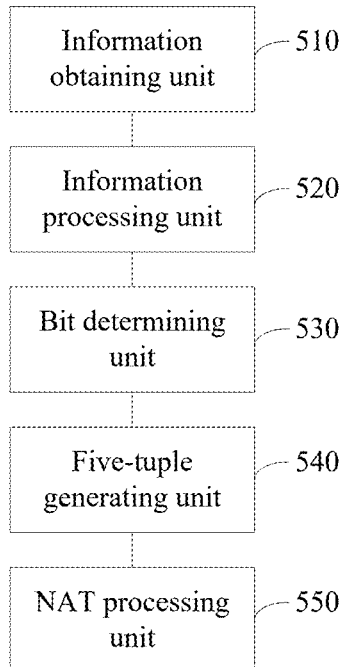
FIG. 5 is a schematic diagram illustrating a structure of a NAT apparatus according to an example of the present disclosure.

Corresponding to the above method example, the present disclosure also provides a NAT apparatus. As shown in FIG. 5, the apparatus may include:

an information obtaining unit 510, configured to obtain a target IP address and a reference port of the target IP address from a NAT resource pool, where the reference port is a port in a consecutive port range of the target IP address;

an information processing unit 520, configured to generate a first five-tuple corresponding to a packet based on the target IP address, the reference port and an original five-tuple of the packet and obtain a second five-tuple by masking first-class bits of the reference port of the first five-tuple;

a bit determining unit 530, configured to determine a target bit indicating a non-conflicting state from a pre-constructed bitmap based on a hash result of the second five-tuple, where each bit in the bitmap is used to indicate whether a state of a five-tuple is a conflicting state or the non-conflicting state;

a five-tuple generating unit 540, configured to set the state indicated by the target bit to the conflicting state and generate a target five-tuple corresponding to the packet based on the target bit; and a NAT processing unit 550, configured to record the target five-tuple and the original five-tuple in a session table, and perform NAT processing for the packet based on the target five-tuple.

In the solution provided by the present disclosure, the bitmap is pre-constructed, and each bit in the bitmap is used to indicate the state of the five-tuple; and then, the non-conflicting five-tuple is determined by querying the bitmap in the creation process. In the solution of the present disclosure, the target bit indicating the non-conflicting state is directly determined from the bitmap, and the non-conflicting five-tuple is further determined based on the target bit, so that the number of times of reading the storage medium is reduced, thereby solving the problem of poor creation performance through the solution of the present disclosure.

Optionally, the bit determining unit 530 is specifically configured to:

calculate a first index value corresponding to the second five-tuple based on a first hash algorithm and determine a first entry from the pre-constructed bitmap based on the first index value, where the bitmap includes a plurality of entries, each entry includes a plurality of bits, and each bit corresponds to a binary character string with a same number of bits as the first-class bits; and determine a target bit from the first entry, where the state corresponding to the target bit is the non-conflicting state, and a port formed by the binary character string corresponding to the target bit and an unmasked part of the reference port is located within the consecutive port range.

Optionally, the apparatus also includes:

a type determining unit, configured to determine an address translation type corresponding to the target five-tuple when it is detected that content recorded in the session table corresponding to the target five-tuple is deleted;

a port masking unit, configured to determine a port matched with the address translation type in the target five-tuple and obtain a third five-tuple by masking the first-class bits of the determined port;

an entry querying unit, configured to calculate a second index value corresponding to the third five-tuple based on the first hash algorithm and determine a second entry from the bitmap based on the second index value; and a conflict adjusting unit, configured to determine a bit corresponding to a target binary character string from the second entry and set the state indicated by the determined bit to the non-conflicting state, where the target binary character string is the first-class bits of the port matched with the address translation type in the target five-tuple.

Optionally, the NAT processing unit 550 is specifically configured to:

record the target five-tuple, the original five-tuple and the address translation type in the session table, and perform NAT processing for the packet based on the target five-tuple.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

Figure 6:
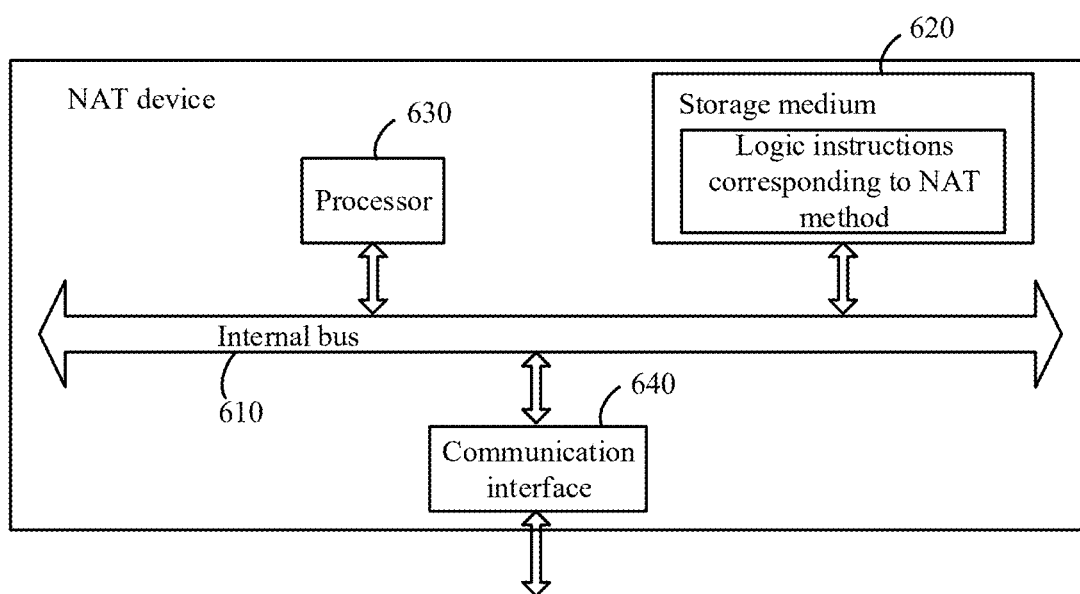
FIG. 6 is a schematic diagram illustrating a structure of a NAT device according to an example of the present disclosure.

Further, corresponding to the above method example, the present disclosure also provides a NAT device. As shown in FIG. 6, the NAT device includes: an internal bus 610, a storage medium 620, a processor 630 and a communication interface 640, where the processor 630, the communication interface 640, and the storage medium 620 communicate with each other via the internal bus 610.

The storage medium 620 is configured to store machine executable instructions corresponding to a NAT method.

The processor 630 is configured to read the machine executable instructions on the storage medium 620 to perform the NAT method provided by the present disclosure.

Relevant descriptions of specific blocks of the NAT method may be referred to descriptions of the method examples of the present disclosure, which are not described herein. Further, it is to be emphasized that the NAT device may be a router, which is not limited herein.

The storage medium 620, for example, may be a non-volatile storage medium. The processor 630 may invoke and execute logic instructions for implementing the NAT method on the storage medium 620 to perform the above NAT method.

The functions for implementing logic instructions of the NAT method, if implemented in the form of software functional units and sold or used as independent products, may be stored in a machine readable storage medium. Based on such understanding, the technical scheme of the present disclosure essentially or a part contributing to the prior art or part of the technical scheme may be embodied in the form of a software product, the computer software product is stored in a storage medium, and includes several instructions for enabling a computer device (such as a personal computer, a server or a network device) to execute all or part of the blocks of the method disclosed by the examples of the present disclosure; and the above storage mediums include various mediums such as a USB disk, a mobile hard disk, a read-only memory (ROM), a random access memory (RAM), a diskette or a compact disk and the like which may store program codes.

After considering the specification and practicing the present disclosure, the persons of skill in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

The foregoing disclosure is merely illustrative of examples of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A Network Address Translation (NAT) method, comprising:
    obtaining a target Internet Protocol (IP) address and a reference port of the target IP address from a NAT resource pool, wherein the reference port is a port in a consecutive port range of the target IP address;
    generating a first five-tuple corresponding to a packet based on the target IP address, the reference port and an original five-tuple of the packet, and obtaining a second five-tuple by masking first-class bits of the reference port of the first five-tuple;
    determining a target bit indicating a non-conflicting state from a pre-constructed bitmap based on a hash result of the second five-tuple, wherein each bit in the bitmap is used to indicate whether a state of a five-tuple is a conflicting state or the non-conflicting state;
    setting the state indicated by the target bit to be the conflicting state, and generating a target five-tuple corresponding to the packet based on the target bit; and
    recording the target five-tuple and the original five-tuple in a session table, and performing NAT processing for the packet based on the target five-tuple.

2. The method according to claim 1, wherein determining the target bit indicating the non-conflicting state from the pre-constructed bitmap based on the hash result of the second five-tuple comprises:
    calculating a first index value corresponding to the second five-tuple based on a first hash algorithm, and determining a first entry from the pre-constructed bitmap based on the first index value, wherein the bitmap comprises a plurality of entries, each entry comprises a plurality of bits, and each bit corresponds to a binary character string with a same number of bits as the first-class bits; and
    determining a target bit from the first entry, wherein the state corresponding to the target bit is the non-conflicting state, and a port formed by the binary character string corresponding to the target bit and an unmasked part of the reference port is located within the consecutive port range.

3. The method according to claim 1, wherein the method further comprising:
    determining an address translation type corresponding to the target five-tuple when it is detected that content recorded in the session table corresponding to the target five-tuple is deleted;
    determining a port matched with the address translation type in the target five-tuple, and obtaining a third five-tuple by masking the first-class bits of the determined port;
    calculating a second index value corresponding to the third five-tuple based on the first hash algorithm, and determining a second entry from the bitmap based on the second index value; and
    determining a bit corresponding to a target binary character string from the second entry, and setting the state indicated by the determined bit to be the non-conflicting state, wherein the target binary character string is the first-class bits of the port matched with the address translation type in the target five-tuple.

4. The method according to claim 3, wherein recording the target five-tuple and the original five-tuple in the session table comprises:
    recording the target five-tuple, the original five-tuple and the address translation type in the session table.

5. The method according to claim 1, wherein the first-class bits are at least one consecutive bit at the end of a bit sequence for indicating a port.

6. A Network Address Translation (NAT) device, comprising: an internal bus, a storage medium, a processor and a communication interface, wherein the processor, the communication interface, and the storage medium communicate with each other via the internal bus, and the storage medium is configured to store machine executable instructions corresponding to a NAT method;
    wherein the processor is configured to read the machine executable instructions on the storage medium to:
    obtain a target Internet Protocol (IP) address and a reference port of the target IP address from a NAT resource pool, wherein the reference port is a port in a consecutive port range of the target IP address;
    generate a first five-tuple corresponding to a packet based on the target IP address, the reference port and an original five-tuple of the packet, and obtain a second five-tuple by masking first-class bits of the reference port of the first five-tuple;
    determine a target bit indicating a non-conflicting state from a pre-constructed bitmap based on a hash result of the second five-tuple, wherein each bit in the bitmap is used to indicate whether a state of a five-tuple is a conflicting state or the non-conflicting state;
    set the state indicated by the target bit to be the conflicting state, and generate a target five-tuple corresponding to the packet based on the target bit; and
    record the target five-tuple and the original five-tuple in a session table, and perform NAT processing for the packet based on the target five-tuple.

7. The device according to claim 6, wherein when determining the target bit indicating the non-conflicting state from the pre-constructed bitmap based on the hash result of the second five-tuple, the processor is also caused by the machine executable instructions to:
    calculate a first index value corresponding to the second five-tuple based on a first hash algorithm, and determine a first entry from the pre-constructed bitmap based on the first index value, wherein the bitmap comprises a plurality of entries, each entry comprises a plurality of bits, and each bit corresponds to a binary character string with a same number of bits as the first-class bits; and
    determine a target bit from the first entry, wherein the state corresponding to the target bit is the non-conflicting state, and a port formed by the binary character string corresponding to the target bit and an unmasked part of the reference port is located within the consecutive port range.

8. The device according to claim 6, wherein the processor is also caused by the machine executable instructions to:
    determine an address translation type corresponding to the target five-tuple when it is detected that content recorded in the session table corresponding to the target five-tuple is deleted;
    determine a port matched with the address translation type in the target five-tuple, and obtain a third five-tuple by masking the first-class bits of the determined port;
    calculate a second index value corresponding to the third five-tuple based on the first hash algorithm, and determine a second entry from the bitmap based on the second index value; and determine a bit corresponding to a target binary character string from the second entry, and set the state indicated by the determined bit to be the non-conflicting state, wherein the target binary character string is the first-class bits of the port matched with the address translation type in the target five-tuple.

9. The device according to claim 8, wherein when recording the target five-tuple and the original five-tuple in the session table, the processor is also caused by the machine executable instructions to:

record the target five-tuple, the original five-tuple and the address translation type in the session table.

10. The device according to claim 6, wherein the first-class bits are at least one consecutive bit at the end of a bit sequence for indicating a port.

* * * * *